US00RE38730E

(19) United States
(12) Reissued Patent
Wells et al.

(10) Patent Number: US RE38,730 E
(45) Date of Reissued Patent: Apr. 26, 2005

(54) AUTOMATIC MULTIPLE-DECANTING CENTRIFUGE AND METHOD OF TREATING PHYSIOLOGICAL FLUIDS

(75) Inventors: John R. Wells, deceased, late of Culver City, CA (US); by Lin A. Jakary, legal representative, La Jolla, CA (US); Steven M. Gann, Huntington Beach, CA (US)

(73) Assignee: Harvest Technologies Corporation, Plymouth, MA (US)

(21) Appl. No.: 09/838,300

(22) Filed: Apr. 20, 2001

Related U.S. Patent Documents

Reissue of:
(64) Patent No.: 5,895,346
Issued: Apr. 20, 1999
Appl. No.: 08/944,179
Filed: Oct. 6, 1997

U.S. Applications:
(62) Division of application No. 08/435,662, filed on May 5, 1995, now Pat. No. 5,707,331.

(51) Int. Cl.[7] ..... B04B 5/02
(52) U.S. Cl. ..... 494/37; 210/782
(58) Field of Search ..... 494/13, 14, 16, 494/17, 20, 32, 33, 35, 37, 85; 210/781, 782; 215/6; 422/102; 220/501, 507, 523, 554

(56) References Cited

U.S. PATENT DOCUMENTS

| | | | | |
|---|---|---|---|---|
| 1,722,396 | A | * | 7/1929 | Reiber |
| 3,164,186 | A | * | 1/1965 | Weber et al. |
| 3,190,546 | A | * | 6/1965 | Raccuglia et al. |
| 3,221,741 | A | * | 12/1965 | Le Veen |
| 3,228,444 | A | * | 1/1966 | Weber et al. |
| 3,235,069 | A | * | 2/1966 | Bennett et al. |
| 3,420,437 | A | * | 1/1969 | Blum et al. |
| 3,586,484 | A | * | 6/1971 | Anderson |
| 3,642,163 | A | * | 2/1972 | McFarland |
| 3,712,535 | A | * | 1/1973 | Genese et al. |
| 3,722,789 | A | * | 3/1973 | Kennedy |
| 3,727,788 | A | * | 4/1973 | Holbrook |
| 3,774,455 | A | * | 11/1973 | Seidler et al. |
| 3,851,817 | A | * | 12/1974 | Buck |
| 3,859,671 | A | * | 1/1975 | Tomasello ..... 215/6 |
| 3,877,634 | A | * | 4/1975 | Rohde et al. |
| 3,951,334 | A | * | 4/1976 | Fleming et al. |
| 3,953,172 | A | * | 4/1976 | Shapiro et al. |
| 4,026,433 | A | * | 5/1977 | Crippa ..... 215/6 |
| 4,066,407 | A | * | 1/1978 | Lupica |
| 4,150,089 | A | * | 4/1979 | Linet ..... 422/102 |
| 4,285,463 | A | * | 8/1981 | Intengan |
| 4,294,372 | A | * | 10/1981 | Onishi |
| 4,431,423 | A | * | 2/1984 | Weyant, Jr. |
| 4,714,457 | A | * | 12/1987 | Alterbaum |
| 4,932,546 | A | * | 6/1990 | Stannard |
| 5,045,047 | A | * | 9/1991 | Hutchins et al. |
| 5,047,004 | A | * | 9/1991 | Wells |
| 5,178,602 | A | * | 1/1993 | Wells |
| 5,199,937 | A | * | 4/1993 | Wada et al. |
| 5,209,776 | A | * | 5/1993 | Bass et al. |
| 5,292,362 | A | * | 3/1994 | Bass et al. |
| 5,318,524 | A | * | 6/1994 | Morse et al. |
| 5,447,245 | A | * | 9/1995 | Merhar ..... 215/6 |
| 5,503,284 | A | * | 4/1996 | Li ..... 220/501 |

FOREIGN PATENT DOCUMENTS

| | | | | |
|---|---|---|---|---|
| CA | 461698 | * | 12/1949 | ..... 220/523 |
| DE | 4323844 | * | 1/1995 | |
| DE | 43 23 844 A1 | * | 1/1995 | |
| FR | 936560 | * | 7/1948 | ..... 220/501 |

* cited by examiner

*Primary Examiner*—Charles E. Cooley
(74) *Attorney, Agent, or Firm*—Clark & Brody

(57) ABSTRACT

A centrifuge is capable of holding a sample container in selected orientations, either during or after centrifugation, to drain supernatants between two or more chambers of the container. The draining may be gravity or centrifugal draining. This allows an automated process to subject a sample to a first physical or chemical treatment to produce a first supernatant, the first supernatant to be subjected to a second physical or chemical treatment, and a second supernatant to be separated from a desired component.

46 Claims, 3 Drawing Sheets

AUTOMATIC MULTIPLE-DECANTING CENTRIFUGE AND METHOD OF TREATING PHYSIOLOGICAL FLUIDS

Matter enclosed in heavy brackets [ ] appears in the original patent but forms no part of this reissue specification; matter printed in italics indicates the additions made by reissue.

CROSS REFERENCE TO RELATED APPLICATION

This application is a division of U.S. application Ser. No. 08/435,662, which was filed on May 5, 1995, now U.S. Pat. No. 5,707,331.

TECHNICAL FIELD

This invention relates to the art of automatic centrifugation. In particular, the invention relates to apparatus and procedures using automatic, multiple decanting with centrifugation. In a preferred embodiment, an automated procedure separates blood components and proteins including the separation of fibrinogen from blood.

BACKGROUND

The separation of components through centrifugation is well known. For example, in the medical field it is common to subject a sample of blood to centrifugation to produce a precipitate of cellular material and a supernatant of plasma. The plasma is then decanted to complete the separation of these components.

U.S. Pat. Nos. 5,178,602 (Wells) and 5,047,004 (Wells) show an automated centrifuge, which includes structure for holding a centrifuge tube, after centrifugation, in a position that allows the supernatant to drain from the tube and into another container by gravity. The holding structure shown in these patents comprises a locking mechanism mounted for axial movement with respect to the axis of rotation of the centrifuge. An electromagnet that is easily controlled causes the axial movement.

It is also known to decant a supernatant by the process of centrifugal draining. According to that process, a centrifuge rotates a centrifuge tube while the tube is held in a position such that the supernatant is drained from the tube by centrifugal forces.

Fibrin sealants for treating wounds are known and are typically produced by combining a fibrinogen/Factor XIII component with bovine thrombin. When these are mixed, a fibrin tissue adhesive results, which is applied to the wound. Descriptions of compositions for use as tissue sealants are given in U.S. Pat. Nos. 5,292,362 and 5,209,776 (Bass et al.). The fibrinogen is obtained from plasma, either pooled or autologous, and cryoprecipitation is one known technique for separating fibrinogen from plasma. One cryoprecipitation technique is described in U.S. Pat. Nos. 5,318,524 and includes the centrifugation of thawing plasma to produce a precipitate containing fibrinogen/Factor XIII. Other techniques for producing fibrinogen/Factor XIII include inducing precipitation of the component by addition of such agents as Ammonium Sulfate or polyethylene glycol (PEG) to blood plasma.

SUMMARY OF THE INVENTION

Several known chemical procedures include repeated steps of physical separation between two or more components. Separation based on density differences between the components is often by centrifugation, and the resulting supernatant is decanted to complete the separation. Each step provides an opportunity for error, which would be reduced by automation of the process.

In accordance with the invention, chemical procedures requiring several centrifugation steps are automated, to reduce the time required by a clinician and eliminate the potential for errors. Apparatus in accordance with the invention includes a multiple-chamber container and a centrifuge designed to receive the container and subject its contents to predetermined centrifugation steps as well as gravity and centrifugal decanting of the supernatant.

A preferred container in accordance with the invention includes first and second chambers separated by an intermediate wall. The first chamber is designed to receive a first liquid, such as human blood. The second chamber is located adjacent the first chamber, and the wall between the chambers is such that a supernatant in the first chamber will flow over the top of the wall and be drained into the second chamber by gravity when the container is held in the proper orientation. The supernatant in the second chamber may then be subjected to a mixing action and then may be subjected to a second centrifugation. The container can also be held in a second position whereby a second supernatant is caused to flow back over the wall into the first chamber by centrifugal forces resulting from a second centrifugation.

A centrifuge in accordance with the invention includes a rotatable support with a swinging frame for receiving the multiple-chamber container and means for locking the container in either of at least two positions for draining supernatant fluids from the chambers. Preferably, the locking means is an electro-magnetically operated disk mounted for movement axially with respect to the axis of rotation of the rotatable support. The centrifuge is preferably operated under the control of an electronic circuit, which may include a programmed array logic (PAL) or other circuitry, that causes the rotor to operate in accordance with a predetermined program and controls the locking means such that it locks the container in predetermined orientations in conjunction with operation of the rotor.

While many different programs for operation of the centrifuge can be developed, depending on the desired results, a preferred operation is for the production of autologous fibrinogen. Prior techniques for production of fibrinogen require several distinct steps, each of which requires a skilled technician but does not eliminate an opportunity for error. These steps include separation of plasma from cellular components, treatment of the plasma with a precipitating agent, and separation of a fibrinogen precipitate "pellet" from the plasma. The separation of plasma from blood and the separation of the fibrinogen pellet from plasma typically require centrifugation first of the blood and then of the plasma, with addition of at least one precipitating agent between the steps. Thus, the production of fibrinogen in the prior art has been complex and error-prone.

In accordance with this embodiment of the invention, a volume of the patient's anticoagulated blood is placed in the first chamber of the disposable container, and a precipitation agent is placed in the second of the chambers. The container is then placed in the swinging frame of the centrifuge, and the control circuit is activated to initiate the operation of the centrifuge. The centrifuge first rotates the container for a time period that has been determined to be adequate for separating the cellular components from the supernatant plasma. During this time, the swinging frame will have rotated outwardly substantially due to centrifugal forces on the container. While the frame is in the outwardly rotated position, the locking means is activated to lock it there. The rotation of the support is then terminated. As the rotational velocity of the support decreases, the supernatant fluid, being no longer subject to the centrifugal forces, flows out of the first chamber and into the second chamber by gravity. The cellular component is more viscous and, thus, flows toward the second chamber at a rate less than that of the plasma. Preferably, however, a divider in the form of a disk is placed in the first chamber to restrict the flow of the cellular components and plasma below the disk. The disk is at a depth that provides a predetermined volume of plasma, which is normally near the expected boundary between the supernatant and cellular components. After a period of time that has been determined to allow an adequate amount of the plasma to flow into the second chamber, the locking means is deactivated to release the container, whereby it assumes an upright position with the cellular component remaining in the first chamber and the plasma now in the second chamber. The rotatable support is then alternately activated and deactivated for short intervals to mix the plasma with the precipitating agent in the second chamber. Interaction between the precipitating agent and the plasma initiates precipitation of fibrinogen and Factor XIII from the plasma. The support is then again rotated to accelerate the precipitation of the fibrinogen/Factor XIII and to create a pellet in the bottom of the second chamber. As a final step, the locking means is again activated to lock the container in a position such that the supernatant resulting from precipitation of the fibrinogen is decanted by centrifugal draining into the first chamber. In this step, the container is held substantially upright, and the support is rotated to apply centrifugal forces to the supernatant, whereby it flows over the wall between the chambers and into the first chamber. The locking means is then inactivated, the container removed from the centrifuge, and the fibrinogen/Factor XIII removed from the second chamber for further processing. In a preferred embodiment, the fibrinogen/Factor XIII is reconstituted, and then combined with thrombin, and applied to a patient to treat a wound.

DETAILED DESCRIPTION OF THE INVENTION

Figure 1:
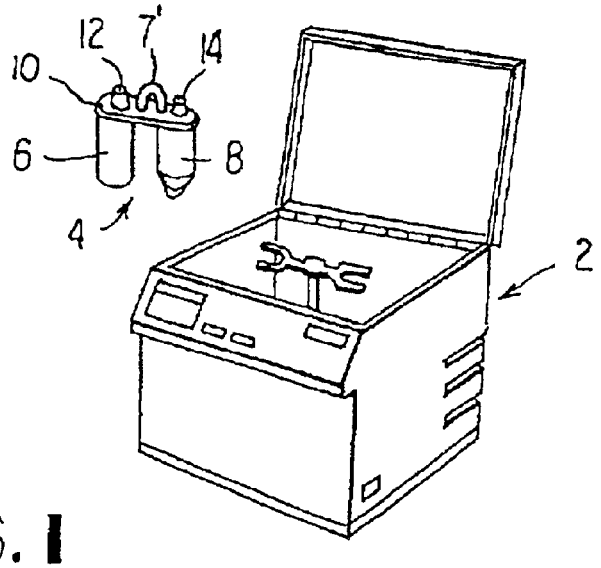
FIG. 1 is a perspective of a container and centrifuge in accordance with the invention.
Figure 2:
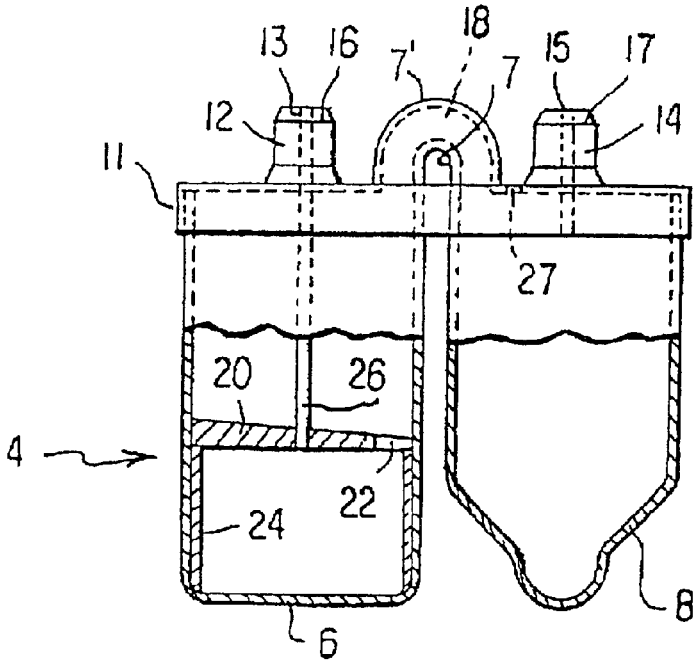
FIG. 2 is a vertical cross section of a preferred embodiment of a container.

With reference to FIGS. 1 and 2 of the drawings, a centrifuge 2 is designed to receive a container 4 in accordance with the invention. The centrifuge is capable of subjecting the container to a series of steps that will be described in detail below. The container includes at least two chambers, 6 and 8. Chamber 6 is designed to receive a first fluid to be treated, such as blood. Chamber 8 is designed to receive fluids that have been decanted from chamber 6, such as a supernatant plasma resulting from centrifugation of blood in chamber 6.

A preferred form of the container is shown in detail in FIG. 2. As shown, the container comprises three primary parts. A base part is preferably molded and includes the chambers 6 and 8 and a bridge 7, which connects the two chambers. A lid 11, also preferably molded, fits over the tops of the chambers to close them. The lid includes cup shaped extensions 12 and 14, each of which is centrally aligned with a respective one of the chambers 6 and 8. Extension 12 has a access port in the form of centrally located opening 13, while extension 14 has a centrally located opening 15. The openings receive syringe needles to permit fluids to be injected into the chambers or withdrawn therefrom. Membranes 16 and 17 cover the openings 13 and 15 to maintain sterility. The membranes are preferably heat sealed into the extensions 12 and 14 during construction by providing a cavity for receiving the membranes. After a membrane is inserted, the upper edges of the cavity are folded over and welded, e.g., ultrasonically, to retain the membrane.

The lid also includes a bridge 7' that cooperates with bridge 7 in the base to form a fluid channel 18, connecting chambers 6 and 8. As shown, the bridge 7 extends above the tops of the chambers 6 and 8 to prevent communication between the chambers by "splashing." Intentional fluid communication between the two chambers will be described in detail below.

A separation disk 20 is preferably placed in chamber 6 near, but always above, the expected vertical position of the boundary between supernatant plasma and cellular components after a first centrifugation of a blood sample. The hematocrit is known to vary among individuals, and the exact amount of plasma that will result from a blood sample cannot be accurately predicted without prior testing of the sample. Thus, disk 20 is located such that the plasma above the disk after centrifugation of a predetermined volume of blood is a predetermined volume of plasma. The upper surface of the disk 20 is tapered toward an edge, and the edge includes at least one groove 22 that allows fluid communication between the parts of the chamber 6 that are above and below the disk 20.

In a preferred embodiment, a cylindrical support 24 is attached to the lower surface of the disk to set the location of the disk during assembly.

A hollow tube 26 is provided to facilitate introduction of the blood sample to the portion of the chamber 6 that is below the disk 20. The tube 26 extends from just below the opening 13 through disk 20. Thus, a syringe needle inserted through opening 13 pierces membrane 16 and communicates with tube 26 to allow injection of the blood sample into the bottom of the chamber 6. The groove 22 permits downward movement of the plasma and cellular components during centrifugation but retards movement of the cellular components during decanting. Also, an air vent 27 is provided for chamber 8 to facilitate introduction and withdrawal of fluids.

In use, a container 4 is placed in a holder on the rotor of the centrifuge as indicated in FIG. 1. To balance the rotor, two such containers are preferably placed in the centrifuge in diametrically opposed positions. Of course, only one container may be used and a weight or "dummy" container used to balance the rotor.

Figures 3A, 3B:
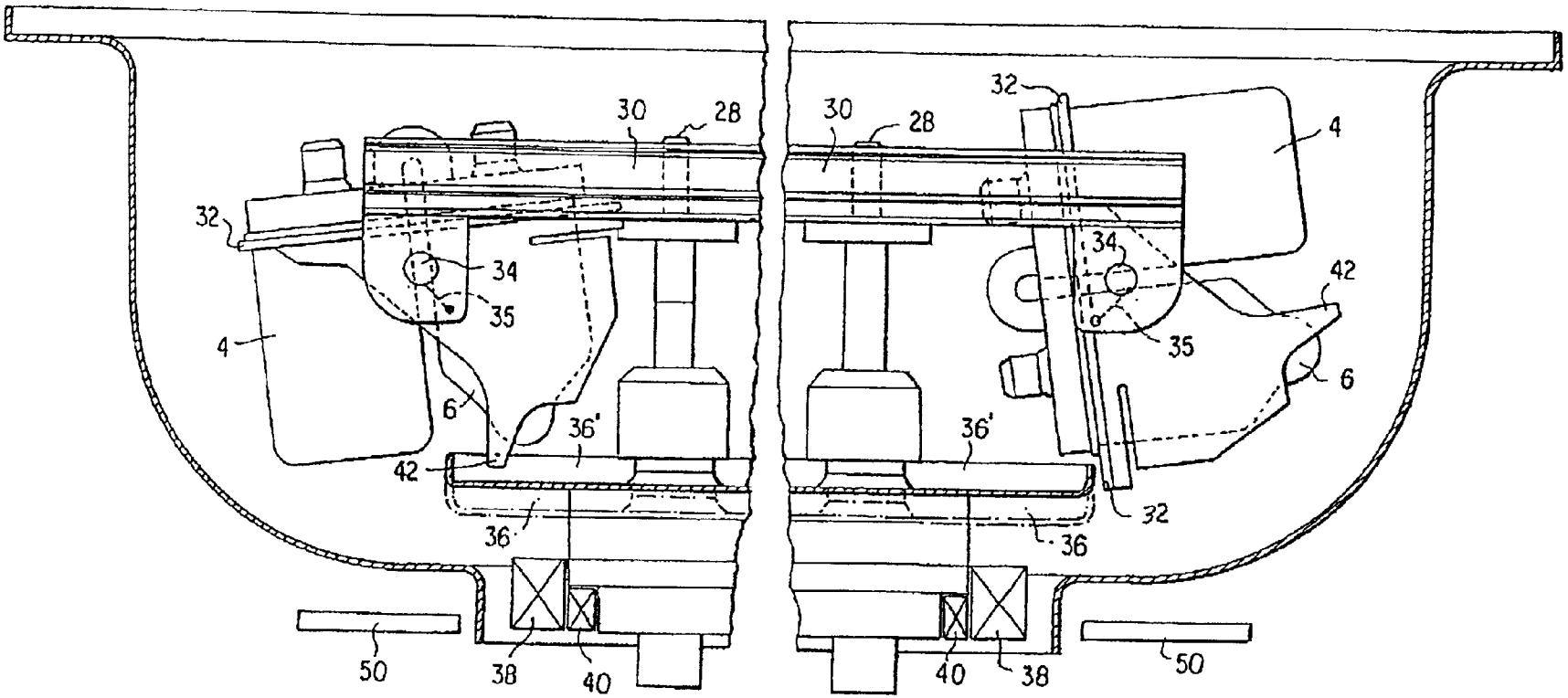
FIGS. 3a and 3b are partial vertical cross sections of the centrifuge of FIG. 1.

FIGS. 3a and 3b are partial cross sections of a preferred embodiment of a centrifuge showing the container locked in two different positions. A rotor shaft 28 is connected to a motor (not shown), which rotates the shaft. A rotor 30 is mounted to the shaft for rotation and has a frame 32 pivotally mounted to the rotor 30 at pivot connection 34. The top surface (not shown) of the frame 32 has two circular openings for receiving the chambers 6 and 8 whereby the container can be placed in the frame such that the contents of the container will be subjected to centrifugal forces as the rotor is rotated. A bias spring 35 ensures that the frame 32 will pivot to an upright position when centrifugation is terminated. The frame 32 may also be shaped to reduce wind resistance, as known in the art.

A locking plate 36 is mounted coaxially with the shaft 28 for engaging the frame 32 to lock the container in desired orientations. The plate and the mechanism for controlling the positions of the plate may be the substantially the same as that shown in my previous U.S. Pat. No. 5,178,602. For example, an electromagnet 38 may be provided to control the position of the locking plate by action on a permanent magnet 40, which is attached to the locking plate.

Preferably, the electromagnet 38 and magnet 40 are positioned such that the locking plate can be placed in either of two positions. In a first position, shown in phantom lines, the plate does not engage the frame 32, and the frame 32 is free to rotate about pivot 34. In a second position, shown in solid lines at 36', the locking plate engages one of two parts of the frame 32 to hold it in one of two selected orientations. In the position shown in FIG. 3a, a lip of the plate engages a protuberance 42 on the frame 32 to lock the container in the orientation shown in FIG. 3a. In the position shown in FIG. 3b the plate 36 engages an upper edge of the frame 32 to lock the container in the tilted position shown in FIG. 3b. The locking plate preferably rotates with the rotor whereby it can be moved to engage the frame during centrifugation of the contents of the container.

The operation of the centrifuge in a preferred embodiment of the invention will be described with regard to FIGS. 4a through 4f. In a first step, blood is introduced into chamber 6 of the container through opening 13. The blood has preferably been obtained from a patient, but it may be pooled or obtained from another. A precipitating agent 43, e.g., PEG, is then placed in chamber 8, preferably by injection through opening 15. The container with blood and precipitating agent are then placed in the centrifuge for automated operation.

Figure 4A:
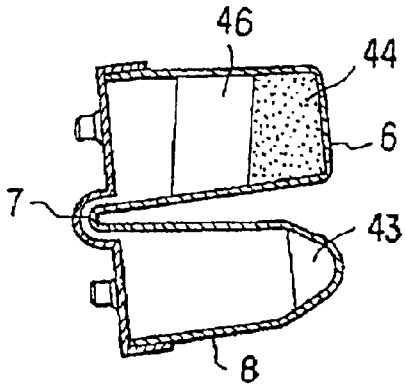
FIGS. 4a through 4f are schematic diagrams illustrating a preferred method of operation of the centrifuge of the invention.
Figure 4B:
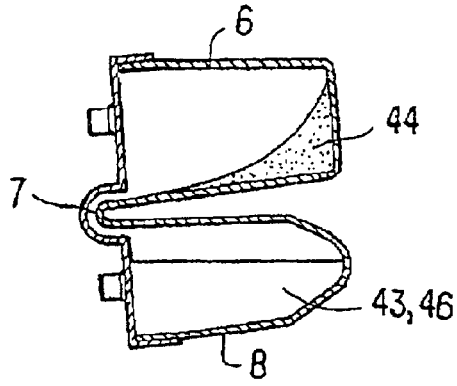
Figure 4C:
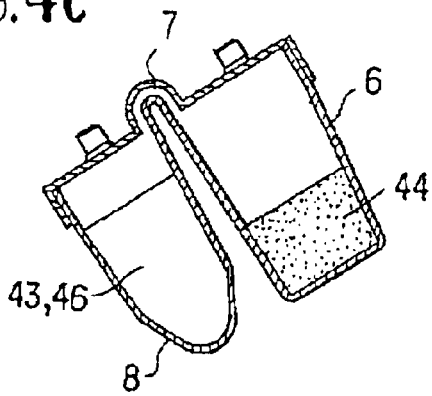
Figure 4D:
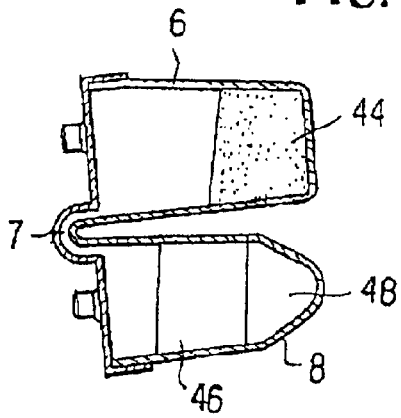

In the first step of automated operation, the container is allowed to swing freely as the blood is subjected to centrifugation. As illustrated in FIG. 4a, the cellular component 44 of the blood will be separated from the plasma component 46 in this step. After a predetermined time period, e.g., five minutes, the locking plate 36 is moved to a position shown at 36' whereby the container 4 is held in the position shown in FIGS. 3b and 4b, and rotation of the rotor is stopped. In this position, the plasma component 46 flows through channel 18 by the force of gravity. The chamber is held in the position of FIG. 4b for preferably about 3 seconds, which is adequate to allow the plasma to drain by gravity into the chamber 8 but is not so long that the more viscous cellular component 44 drains into the chamber 8. The plasma 46 and precipitating agent 43, which was previously placed in chamber 8, are now both in chamber 8. To provide complete mixing of these fluids, the locking plate is lowered, and the rotor is caused to accelerate and decelerate alternately for 10–20 seconds, as illustrated in FIG. 4c. The precipitating agent causes the fibrinogen/Factor XIII to separate from the plasma, and this separation is assisted by centrifuging the contents of the container a second time. This second centrifugation may be for a period of about five minutes. A fibrinogen pellet 48 is, thus, formed in the bottom of the chamber 8, as illustrated in FIG. 4d. At this stage of the process, the plasma supernatant 46 remains in chamber 8.

Figure 4E:
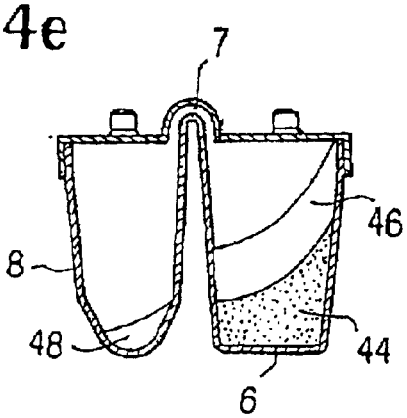
Figure 4F:
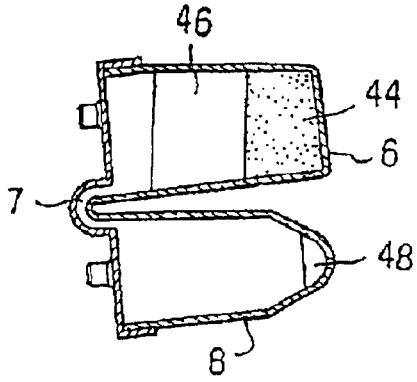

Plasma 46 is separated from the fibrinogen pellet 48 by stopping rotation of the centrifuge rotor to allow the container to pivot to the upright position shown in FIGS. 3a and 4e. The locking plate 36 is then activated to lock the container in that orientation by engagement with protuberance 42, and the container is again rotated by the rotor for a period of about three to eight seconds. This rotation causes the supernatant plasma 46 to flow back through channel 18 and into chamber 6 by centrifugal draining, as illustrated in FIG. 4e. Thus, the fibrinogen pellet and plasma have now been separated. As a final step, the container is subjected to another centrifugation illustrated in FIG. 4f for about fifteen seconds, whereby the fibrinogen pellet is forced into the bottom of the chamber 8.

The automated process for production of fibrinogen is at this point complete, and the fibrinogen pellet is preferably extracted from the container 8 by a syringe for further processing. For example, the fibrinogen may be reconstituted and combined with thrombin to produce a sealant or an adhesive.

The apparatus of the invention may be used for other automated processes. For example, another technique for the separation of fibrinogen from blood in accordance with the structure of the invention uses cryoprecipitation. According to this technique, plasma is frozen to a temperature of about minus 20° C., thawed, and then centrifuged to separate the fibrinogen from plasma. The multiple-decanting apparatus of this invention may be used to automate cryoprecipitation by inclusion of a temperature control device 50 in thermal contact with the centrifuge. The temperature control device may comprise any of several known structures, including liquid nitrogen or liquid oxygen based devices and refrigeration devices.

To effect automated cryoprecipitation, a sample of blood is placed in the first chamber 8, and the container is then placed in the centrifuge and subjected to a first centrifugation. The plasma is then drained into the second chamber 8, for example by gravity draining. The temperature control device is then activated first to freeze the plasma and then to allow the plasma to thaw. The thawed plasma is subjected to a second centrifugation, which separates fibrinogen from the remainder of the plasma. The supernatant plasma is then separated from the fibrinogen by draining it back into the first chamber, for example by centrifugal draining, whereby only fibrinogen remains in the second chamber. The container is then removed from the centrifuge, and the fibrinogen removed from it for use as described above. Of course, the freeze-thaw-centrifuge process may be carried out any number of times before the supernatant is drained back into the first chamber.

Modifications within the scope of the appended claims will be apparent to those of skill in the art.

We claim:

1. A method for automatic separation of components from fluids comprising placing first and second chambers in a centrifuge, subjecting said first chamber to centrifugation, locking said chambers in first positions such that a supernatant in said first chamber drains into said second chamber, subjecting said second chamber to centrifugation, and locking said chambers in second positions for allowing a supernatant in said second chamber to transfer to another of said chambers.

2. A method according to claim 1 wherein said another of said chambers is said first chamber, said supernatant in said first chamber drains into said second chamber by gravity draining, and said supernatant in said second chamber transfers into said first chamber by centrifugal transfer.

3. A method according to claim 1 further comprising the step of freezing said supernatant in said second chamber prior to said step of subjecting said second chamber to centrifugation.

4. A method according to claim 3 further comprising thawing said supernatant and wherein said step of subjecting said second chamber to centrifugation is performed as said supernatant is thawing.

5. A method according to claim 4 wherein said another of said chambers is said first chamber, said supernatant in said first chamber drains into said second chamber by gravity draining, and said supernatant in said second chamber transfers into said first chamber by centrifugal transfer.

6. A method for separation of components of a substance comprising:

placing a first substance in a first chamber of a container having at least two separate chambers in fluid communication with each other, rotating said container to centrifuge said first substance and separate said first substance into a first component and a second component, locking said container in a first position that allows said first component to flow into a second chamber of said container, rotating said container again to centrifuge said first component to produce a third component and a fourth component, and locking said container in a second position that allows said third component to flow to said first chamber.

7. A method according to claim 6 wherein said first component drains into said second chamber by gravity.

8. A method according to claim 7 further comprising the step of centrifugally transferring said third component by rotating said container while locking said container in said second position.

9. A method according to claim 8 wherein said first substance contains blood, said first component contains plasma, and said fourth component contains fibrinogen.

10. A method according to claim 9 wherein said second chamber is supplied with a precipitating agent prior to said step of rotating said container to centrifuge said first substance.

11. A method according to claim 10 wherein said precipitating agent is PEG.

12. A method for centrifuging substances comprising: providing a removable container having a plurality of chambers for receiving substances to be centrifuged; placing one or more substances in said container; rotating said container a first time to subject said substances to centrifugation; locking said container in a first position to allow a supernatant in one of said chambers to transfer into a second of said chambers; and locking said container in a second position and rotating said container a second time to transfer a supernatant in said second chamber to said one of said chambers.

13. The method of claim 12, wherein the step of locking said container in said first position causes said supernatant in said one of said chambers to transfer substantially into said second chamber by gravity.

14. The method of claim 12, wherein the step of locking said container in said second position and rotating said container causes a supernatant in said second chamber to transfer substantially into said one of said chambers by centrifugal transferring.

15. The method of claim 12, wherein the step of locking the container in said first position comprises holding said container in said first position for a predetermined period of time.

16. The method of claim 12, wherein the step of locking the container in said first position comprises controlling the position of a movable plate.

17. The method of claim 12, further comprising controlling the locking and rotating of said container to provide automatic multiple decanting, wherein the container is locked and/or rotated at respective intervals of predetermined duration.

18. The method of claim 12, further comprising the step of mixing said one or more substances in said container by accelerating and decelerating the rotation of the container.

19. The method of claim 12, further comprising the step of maintaining the substances in at least one chamber separate from each other with a divider.

20. The method of claim 19 wherein said divider has an opening for allowing said substances to be discharged from said at least one chamber.

21. The method of claim 12, wherein the step of placing one or more substances into said container comprises the step of placing blood in said one of said chambers and a precipitating agent in said second of said chambers, wherein the step of rotating said container a first time causes a supernatant plasma to be separated from a cellular component of said blood, and the step of locking said container in said first position causes said supernatant plasma to be substantially transferred from said one of said chambers into said second of said chambers, while substantially leaving said cellular component in said one of said chambers.

22. The method of claim 21, further comprising the step of mixing said supernatant plasma and said precipitating agent in said second chamber, and rotating said container again to cause fibrinogen and Factor XIII to be precipitated from the supernatant plasma to create a pellet in said second of said chambers.

23. The method of claim 22, wherein the step of locking and rotating said container a second time causes a supernatant resulting from said precipitation to be substantially transferred from said second chamber to said one of said chambers, thereby leaving behind said pellet in said second chamber.

24. A method for centrifuging substances comprising: providing a unitary container having a plurality of chambers therein for receiving substances to be centrifuged; placing one or more substances into said container; rotating said container a first time to subject said substances to centrifugation; locking said container in a first position to allow a supernatant to be transferred from one chamber to another chamber by gravity; locking said container in a second position and rotating said container a second time to cause a supernatant to be transferred from one chamber to another chamber by centrifugal transfer.

25. The method of claim 24, wherein the container comprises a first and a second chamber, wherein the step of placing substances within the container comprises placing one substance in the first chamber and a second substance in the second chamber.

26. The method of claim 25, wherein the step of rotating said container a first time causes a supernatant to separate from the one substance in said first chamber, wherein the step of locking the container in said first position causes the supernatant in said first chamber to be transferred by gravity into said second chamber through a passage between said first and second chambers.

27. The method of claim 26, further comprising the step of mixing said supernatant and second substance in said second chamber by accelerating and decelerating the rotation of the container for a predetermined time, wherein said mixing helps to produce a precipitation in said second chamber.

28. The method of claim 27, further comprising rotating the container again to accelerate the formation of said precipitation in said second chamber, wherein the precipitate in said second chamber is forced to the bottom of said second chamber in the form of a pellet.

29. The method of claim 28, wherein the step of rotating the container a second time causes the supernatant resulting from said precipitation to be transferred from said second chamber to said first chamber, leaving behind the precipitation in the form of a pellet in said second chamber.

30. The method of claim 29, further comprising controlling the steps in the process to provide automatic multiple decanting which allows for activation of one or more steps in the process for a predetermined period of time.

31. The method of claim 30, wherein the step of placing one or more substances in said container comprises placing blood in said first chamber and a precipitating agent in said second chamber.

*32. A method for treating physiological products, comprising:*

*providing a centrifuge;*

*providing a container having at least a first chamber and an adjacent second chamber, wherein each of the first and second chambers has a top portion, a bottom portion and a set of walls, wherein the top portions of the first chamber and second chamber are adjacent each other and connected by a bridge for transferring fluid therebetween when said container is in a predetermined orientation;*

*providing a holder assembly attached to the centrifuge and effective to removably receive the container, wherein the holder assembly is effective to orient the container in said predetermined orientation; and placing a physiological product in one of said chambers.*

*33. The method of claim 32, wherein the chambers include lid portions, thereby forming a closed container.*

*34. The method of claim 33 wherein at least one of the chambers includes an access port for transference of a liquid.*

*35. In a method of treating physiological fluids, the improvement comprising providing a container adapted to contain said fluids during treatment, wherein said container comprises:*

*a first sterile chamber having a first top portion, a first bottom portion and a first set of walls;*

*a second sterile chamber adjacent said first sterile chamber and having a second top portion adjacent said first top portion, a second bottom portion and a second set of walls;*

*a bridge connecting said first top portion of the first chamber and said second top portion of the second chamber, such that a fluid can be transferred from the first chamber to the second chamber while the container is positioned at a predetermined angle, and means for sterile transfer of a fluid to or from at least one of said chambers independently of the other of said chambers and located near the top of at least one of said chambers, and*

*placing a physiological fluid in one of said chambers.*

*36. The method of claim 35, wherein the chambers include a lid portion.*

*37. A method for treating physiological products and maintaining sterility of said products during said treating comprising:*

*providing a container having a plurality of closed, sterile fluid-receiving chambers, a bridge forming a fluid path allowing fluid communication between a first of said chambers and a second of said chambers when said container is in a predetermined orientation, and at least one access port allowing sterile access to at least one of said chambers,*

*providing a centrifuge having a holder removably receiving said container and allowing said container to assume a first orientation wherein a physiological product in one of said chambers is subjected to centrifugation and said predetermined orientation wherein fluid in said first of said chambers flows along said fluid path to said second of said chambers, and said centrifuge comprises a locking element that selectively holds said container in said predetermined orientation, and*

*placing a physiological product in one of said chambers.*

*38. A method according to claim 37 wherein said holder comprises a frame pivotally mounted to a rotor of said centrifuge.*

*39. A method according to claim 37 wherein said locking element comprises a movable locking plate that is movable between free and locking positions, wherein said movable locking plate allows said container to assume said first orientation when in said free position and holds said container in said predetermined position when in said locking position.*

*40. A method according to claim 39 wherein said centrifuge further comprises an electromagnet for moving said locking plate to one of said locking end free positions.*

*41. A method according to claim 37 wherein said holder comprises a frame pivotally mounted to a rotor of said centrifuge, and said locking element comprises a movable locking plate that is movable between free and locking positions, wherein said movable locking plate allows said container to assume said first orientation when in said free position and holds said container in said predetermined position when in said locking position.*

*42. In a method of treating physiological fluids, the improvement comprising providing a container adapted to contain said fluids during treatment, wherein said container comprises a base forming a plurality of sterile chambers, each of said chambers having a bottom and a top, a bridge connecting top portions of at least two of said chambers and arranged to provide a sterile fluid channel from a first of said at least two sterile chambers to a second of said at least two sterile chambers when said container is in a predetermined orientation, a lid closing said top of each of said plurality of chambers, and an access port near the top of at least one of said chambers that allows sterile transfer of a liquid to or from said at least one of said chambers independently of the other of said chambers from the exterior of said container to the interior of said at least one of said chambers, and placing a physiological fluid in one of said plurality of sterile chambers.*

*43. A method according to claim 42 wherein said plurality of sterile chambers and said bridge comprise a molded base part.*

*44. A method according to claim 43 wherein said container is substantially rigid.*

*45. A method according to claim 42 wherein said container further comprises a separation disk in one of said chambers.*

*46. A method according to claim 42 wherein said plurality of chambers comprise first and second adjacent chambers having adjacent sidewalls and said bridge is formed at the tops of said adjacent sidewalls.*

* * * * *